United States Patent [19]
Robecchi et al.

[11] 3,899,014
[45] Aug. 12, 1975

[54] PNEUMATIC TIRE

[75] Inventors: Edoardo Robecchi; Giuseppe Tavazza, both of Milan, Italy

[73] Assignee: Industrie Pirelli S.p.A., Milan, Italy

[22] Filed: Feb. 12, 1974

[21] Appl. No.: 441,769

[30] Foreign Application Priority Data
Feb. 22, 1973 Italy ................................. 20684/73

[52] U.S. Cl. ... 152/353 C; 152/209 WT; 152/330 RF; 152/361 R
[51] Int. Cl. ..... B60c 13/00; B60c 9/18; B60c 17/00
[58] Field of Search ..... 152/353 C, 361 R, 361 DM, 152/361 FP, 166, 352, 355, 357, 330 RF, 209 WT

[56] References Cited
UNITED STATES PATENTS
2,477,754  8/1949  Kraft .................................. 152/166
2,958,359  11/1960  Bousu et al. ..................... 152/361 R
3,805,868  4/1974  Tangorra ........................... 152/353 C

*Primary Examiner*—Drayton E. Hoffman
*Attorney, Agent, or Firm*—Stevens, Davis, Miller & Mosher

[57] ABSTRACT

A pneumatic tire is disclosed having a tread, an annular reinforcing structure in the tread, sidewalls and beads wherein the sidewalls have a section midline which is convex to the inside of the tire, both before and after inflation. The annular reinforcing structure is substantially inextensible and has sections in the central portion near the plane of the axis of rotation which have their own concavity and wherein the concavity at the central portion differs in an opposite sense from that of the lateral portions.

6 Claims, 1 Drawing Figure

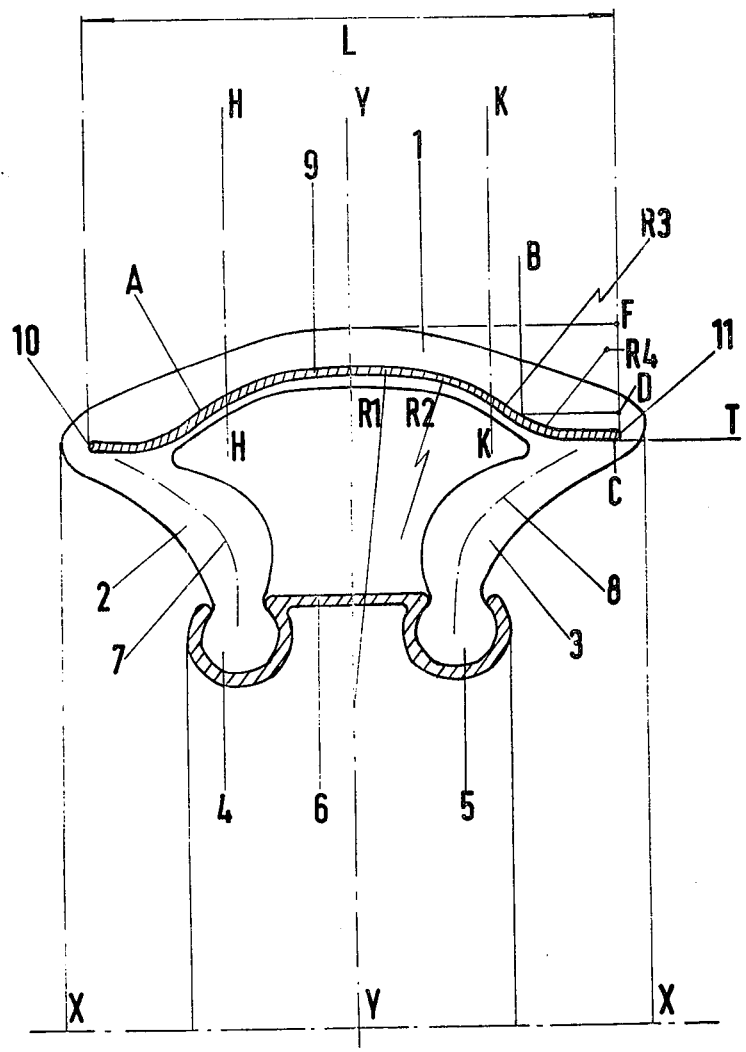

PNEUMATIC TIRE

The present invention concerns pneumatic tires for vehicle wheels and more precisely it relates to the annular reinforcing structure inserted in a radially inner position with respect to the tread.

It is known that this reinforcing structure is generally constituted by a plurality of superimposed layers of rubberized cords wherein the cords of each layer are parallel to one another and cross those of the other layers. The cords of each layer can be formed by various materials, as for instance textile or metallic materials or the like and can be combined with analogous types of cords forming the other layers, or with different types of cords, according to the purposes which one wishes to obtain.

It is also known that the meridian profile of the annular reinforcing structure, i.e., the profile contained in the section of each plane passing through the axis of rotation of the tire, plays an important role in the general behavior of the tire during use. In fact, the meridian profile can have a remarkable influence on several working characteristics, as for instance tread wear, adherence to the ground, road traction, resistance to lateral thrusts, comfort and noise.

In fact, even if that part of the tire which comes into contact with the ground is the tread, nevertheless it is the annular reinforcing structure which, together with the carcass, withstands the inflation pressure and controls the deformations of the tire under those stresses occurring during use.

Consequently it is necessary for the meridian profile of said reinforcing structure to have a form consistent with the meridian profile of the carcass; if not, detachment can occur between the two resistant elements, with a consequent premature destruction of the tire.

However, as in presently known tires, be they of the conventional type (carcass with crossed cords) or of the radial type (carcass with cords lying in radial planes), the cords are arranged in an uninterrupted manner from one bead of the tire to the other, it is evident that the carcass profile at the sidewalls requires strong limitations of the profile of the annular reinforcing structure situated radially inwardly of the tread.

In general, in the top portion of the tire, the profiles of said reinforcing structure and of said carcass must substantially coincide, and any deviation must be balanced by particular measures intended to avoid the above indicated possibility of detachment.

For instance, if a carcass, at the tire top portion, has a section profile of a certain curvature and one wishes to impart to the reinforcing structure a section profile having a lesser curvature (in order to improve the resistance of the tire to transversal deformation), it is necessary to provide structural shapes of rubber between the two resistant elements, which may compensate for said profile differences and may absorb the mutual displacements due to the different stress intensities.

As the difference in the profiles is generally maximized at the lateral ends of the annular reinforcing structure, the thickness of the structural shape must have its maximum value in said portions; said values, however, cannot exceed a certain limit, since then it would become difficult, if not impossible, to dissipate the heat generated by hysteresis in said structural shapes when the tire is in use. Thus, for reasons unrelated to the inconsistency of the profiles, there would still be the risk of detachments between said resistant structures.

It follows that, even if particular expedients are adopted, the profile of the reinforcing structure situated radially inwardly of the tread is always subjected to particular limitations in conventional tires having a carcass whose cords are uninterruptedly arranged from one bead to the other and are subjected to tension stresses during use.

Since, as indicated above, the meridian profile of said reinforcing structure has a remarkable influence on the tire behavior in service, the adoption of a profile quite different from those already known would be desirable in order to improve certain characteristics of the tire itself.

In copending application Ser. No. 273,337 filed July 19, 1972, now U.S. Pat. No. 3,805,868 there is described a tire in which the section midline of the sidewalls has its convexity directed towards the inside of the tire and in which said sidewalls, in use, work prevailingly under compression or combined bending and compression.

Due to the different nature of the prevalent stresses to which the sidewalls and the reinforcing structure arranged radially inwardly of the tread are respectively subjected, i.e., combined bending/compression and tension, a tire of this type permits a wider design freedom for the profile of the annular reinforcing structure, in comparison with that which can be used in the above mentioned conventional tires, whose sidewalls are subjected to tension.

Therefore, reinforcing structures which would be inconsistent with the carcass of said known tires, can instead be applied to the tire described in the above indicated patent application.

The present invention aims at providing a pneumatic tire for vehicle wheels comprising a tread, an annular reinforcing structure incorporated in said tread, two sidewalls comprising elastomeric material and terminating into beads intended to be encased in appropriate seats obtained in the wheel rim, said sidewalls having in the sections of each plane containing the axis of rotation of the tire a section midline whose convexity is directed towards the tire inside, said convexity being unchanged in sense under the thrust of the inflation pressure, said annular reinforcing structure being substantially inextensible and defining contours, in proximity of the lateral edges of said tread, whose points are at a substantially invariable distance, with respect to pressure variations, from the points defined by said beads in the same section planes, characterized in that said annular reinforcing structure, in the sections of each plane containing said axis of rotation, when the tire is inflated at its service pressure, has a profile whose curvature has its own concavity, at the structure's central portion, directed in an opposite sense with respect to its concavity at the structure's lateral portions.

The main advantage of the tire according to the present invention resides in the fact that it is possible to impart to the annular reinforcing structure a variable rigidity along the meridian section of said profile as a result of the profile.

In fact, it is known that, within certain limits, the modulus of elasticity of a material tends to increase by increasing the tension stress to which said material is subjected.

By imparting differentiated curvatures to said profile, it is possible to obtain tension stresses graduated along the meridian profile of said structure when the tire is inflated at its service conditions. Therefore, the cords lying in the zones subjected to greater tension acquire a greater rigidity than those cords lying in the less stressed zones, and consequently it is possible to impart the desired rigidity to those portions of the reinforcing structure in which this feature is of greater necessity for improved behavior of the tire when in use.

According to a preferred embodiment of the invention, the concavity of said profile, at the structure's central portion, is directed in a radially inner direction of the tire, while the concavity of said profile, at the structure's lateral portions, is directed in a radially outer direction of the tire.

In this way it is possible to impart to the lateral ends of the annular reinforcing structure a rigidity greater than that existing at its central portion; therefore a tire is obtained, which possesses improved comfort characteristics and at the same time improved resistance to transversal stresses during use.

Preferably, the concavity of said profile changes in sense at the zone situated axially outwardly with respect to the line equidistant between the midline of the profile and each lateral end of the latter.

According to another preferred embodiment of the present invention, said profile has a curvature decreasing from the midline of the profile towards each of the lateral ends of the latter.

Preferably, the radial distance between each lateral end of said profile and the projection, on the vertical line passing through said lateral end, of the point where the curvature of the lateral portion begins, is less than 50 percent of the radial height of said profile.

According to a further preferred embodiment of the invention, at each lateral portion which joins the corresponding sidewall, the tangent to said profile forms an angle no greater than 30° with respect to the axis of rotation of the tire.

Preferably, at each lateral portion which joins the corresponding sidewall, the tangent to said profile is parallel to the axis of rotation of the tire.

The pneumatic tire according to the latter preferred solution affords a further advantage; in fact, the tire portion in contact with the ground, as a result of the applied load, suffers a deformation which, particularly in the lateral portions of the annular reinforcing structure, results in an angular displacement of the latter with respect to the position of the corresponding sidewall.

Said angular displacement, which is repeated at each turn of the wheel, induces fatigue phenomena which unavoidably affect the tire life.

If at said lateral portions the tangent to said profile of the annular reinforcing structure is parallel to the axis of rotation of the tire (or at least forms an angle no greater than 30° with the latter), said angular movements are annulled or at least reduced so that also said fatigue phenomena are eliminated or reduced to acceptable limits.

The invention will now be better illustrated with reference to the attached drawing, in which, by way of example: the FIGURE represents the cross section of a tire according to the present invention, inflated to its service pressure.

The tire shown in the FIGURE comprises a tread 1, two sidewalls 2 and 3 and two beads 4 and 5 encased into appropriate seats obtained in a rim 6.

In said sidewalls 2 and 3, the section midlines 7 and 8 have a convexity directed towards the tire inside and, as described in copending application Ser. No. 273,337, said convexity does not change in sense under the thrust of the inflation pressure so that said sidewalls, in normal service conditions, work prevailingly under compression rather than under tension.

An annular reinforcing structure 9 is arranged in a radially inner position with respect to the tread 1; said structure is radially flexible but inextensible both in the axial direction and in the circumferential direction when it is simultaneously stressed in said two directions by the inflation pressure.

Said structure is constituted by several layers of textile or metallic cords parallel to one another in each layer and crossing those of the adjacent layer. It extends axially for the whole upper part of the tire, concerning also the extreme portions of said part, which are respectively connected to the sidewalls 2 and 3.

The meridian profile of the annular structure 9 (or the profile of the same contained in the sections of each plane passing through the axis of rotation XX of the tire) has, at the central portion of the tire, a curvature whose concavity is directed towards the inside of the tire itself, while at the two lateral portions the curvature of said profile has its concavity directed towards outside of the tire.

In said meridian profile, the curvature having its concavity directed towards the tire inside extends as far as points A and B, which are respectively situated axially outwardly with respect to the vertical lines H—H and K—K lying in a position equidistant between the midline YY and the respective lateral ends 10 and 11 of the profile of the annular reinforcing structure 9.

More precisely, points A and B are situated at a distance from said midline YY which is of approximately 30 percent with respect to the axial width L of the whole profile.

In the portions comprised between said points A and B and the respective lateral ends 10 and 11 of the structure 9, the profile takes a curvature having its concavity directed towards the tire outside.

By projecting point B on the vertical line passing through the end 11 of the annular structure 9, segment CD is determined; the length of said segment is less than 50 percent of the radial height of the profile of said structure, given by segment CF.

More precisely, segment CD ranges between 15 and 21 percent of CF.

As illustrated in the FIGURE, the profile of the annular reinforcing structure 9 is defined by a series of radii, whose value progressively increases from the midline YY towards each of the lateral ends of the profile itself.

For a profile having a length L=180 mm, the radii which define said profile are R1 = 80 mm, R2 = 110 mm, R3 = −100 mm, R4 = −30 mm; the positive values indicate the radii of the curvature having its concavity directed towards the tire inside, and the negative values indicate the radii of the curvature having its concavity directed towards the tire outside, the profile of the structure 9 being symmetrical with respect to the midline YY.

At each lateral portion which joins the corresponding sidewall, the tangent T to said profile forms an angle not greater than 30° with respect to the axis of rotation XX of the tire; preferably, said tangent is parallel to said axis of rotation, as indicated in the FIGURE.

It is understood that the above reported examples are not limiting and that the scope of protection of the present invention includes any alternative embodiment deriving from the above indicated inventive concept.

What is claimed is:

1. A pneumatic tire for vehicles comprising
a tread,
an annular reinforcing structure incorporated in said tread,
two sidewalls comprising eleastomeric material and terminating into beads intended to be encased in appropriate seats in the wheel rim, said sidewalls having in those sections of each plane containing the axis of rotation of the tire, a section midline whose convexity is directed towards the tire inside, said convexity being unchanged in sense under the thrust of tire inflation pressure,
said annular reinforcing structure being substantially inextensible and defining contours, in proximity of the lateral edges of said tread, whose points are at a substantially invariable distance, with respect to pressure variations, from the points defined by said beads in the same section planes, characterized in that said annular reinforcing structure, in the sections of each plane containing said axis of rotation, when the tire is inflated at its service pressure, has a profile whose curvature has its own concavity, at the structure's central portion, directed radially inwardly of the tire, while the concavity of the profile at the structure's lateral portions is directed radially outwardly of the tire.

2. The pneumatic tire of claim 1 wherein the concavity of the profile changes in sense at the portion situated axially outwardly with respect to a line equidistant between the midline of the profile and each lateral end of the latter.

3. The pneumatic tire of claim 1 wherein the profile has a curvature which decreases from the midline of the profile towards each of the lateral ends of the latter.

4. The pneumatic tire of claim 1 wherein the radial distance between each lateral end of said profile and the projection, on the vertical line passing through said lateral end, of the point where the curvature of the lateral portion begins, is less than 50 percent of the radial height of said profile.

5. The pneumatic tire of claim 4 wherein at each lateral portion which joins the corresponding sidewall, the tangent to said profile forms an angle no greater than 30° with respect to the axis of rotation of the tire.

6. The pneumatic tire of claim 5 wherein at each lateral portion which joins the corresponding sidewall, the tangent to said profile is parallel to the axis of rotation of the tire.

* * * * *